Patented Nov. 15, 1927.

1,649,384

UNITED STATES PATENT OFFICE.

HENRY BLUMENBERG, JR., OF MOAPA, NEVADA.

PROCESS OF TREATING CRACKED HYDROCARBON DISTILLATION PRODUCTS.

No Drawing.   Application filed February 14, 1927.   Serial No. 168,236.

My invention relates to a process of treating cracked hydrocarbon distillation products and especially cracked gasoline, some of which, as well known, are particularly difficult to decolorize and deodorize. Cracked gasoline often contains sulphur and nitrogen compounds which are not amenable to the treatment even with pyro-sulphuric acid in excessive amounts.

I have discovered that by treating cracked gasoline with aluminum chloro sulphate $AlSO_4Cl.5H_2O$ the objectionable sulphur and nitrogen compounds are readily eliminated.

My invention consists in the steps of the process hereinafter described and claimed.

I add from 2 to 5 per cent of aluminum chloro sulphate by weight to the cracked gasoline to be treated, depending upon the sulphur and nitrogen contents, at atmospheric pressure and temperature, although it is preferable to raise the temperature to about 40° C. The reaction takes from 15 to 45 minutes. From 10 to 20 per cent water is added to the gasoline and the mixture is agitated. The aluminum chloro sulphate will combine with the sulphur and nitrogen contents of the gasoline and form a sludge and also liberate sulphur in the form of hydrogen sulphide and other volatile sulphur compounds. After the sludge is allowed to settle the clear liquid is decanted and subjected to the usual neutralization treatment to remove the acidity of the mixture and the washing water is separated.

The resulting gasoline is water clear and free from any objectionable odors.

Various changes may be made in the steps of the process by those skilled in the art without departing from the spirit of my invention as claimed.

I claim:

1. A process of decolorizing and deodorizing cracked gasoline comprising treating the cracked gasoline with aluminum chloro sulphate.

2. A process of decolorizing and deodorizing cracked gasoline comprising treating the cracked gasoline with aluminum chloro sulphate and water under agitation.

3. A process of decolorizing and deodorizing cracked gasoline comprising treating the cracked gasoline with aluminum chloro sulphate and water under agitation and heating the mixture to 40° C.

4. A process of decolorizing and deodorizing cracked gasoline comprising adding from 2 to 5 per cent of aluminum chloro sulphate and water, heating and agitating the mixture whereby a sludge is formed, allowing the sludge to settle and removing the supernatant liquor.

5. A process of decolorizing and deodorizing cracked gasoline comprising adding from 2 to 5 per cent of aluminum chloro sulphate and water, heating and agitating the mixture whereby a sludge is formed, allowing the sludge to settle, removing the supernatant liquor and neutralizing the acidity of the supernatant liquor.

In testimony whereof I have signed my name to this specification.

HENRY BLUMENBERG, JR.